UNITED STATES PATENT OFFICE.

ROBERT MEYER, OF PARIS, FRANCE, ASSIGNOR TO SOCIETE LES ETABLISSEMENTS POULENE FRERES, OF PARIS, FRANCE.

MANUFACTURE OF DIAMINOACRIDINE.

1,410,494.     Specification of Letters Patent.    Patented Mar. 21, 1922.

No Drawing.    Application filed June 3, 1919.    Serial No. 301,421.

*To all whom it may concern:*

Be it known that I, ROBERT MEYER, citizen of the Republic of France, residing at Paris, France, have invented certain new and useful Improvements in the Manufacture of Diaminoacridine, of which the following is a specification.

The present invention relates to improvements in the manufacture of 3:6 diaminoacridine.

By the process of this invention in a single operation the reaction and condensation are completed in contradistinction to previous processes in which the aminophenyl basic compound has first to be nitrated then the intermediate product reduced and condensed in an acid bath followed further by oxidation of the diaminohydroacridine which constitutes a large proportion of the resultant product.

According to the invention m-phenylenediamine $(C_6H_4NH_2)_2$ is melted with formic or oxalic acid preferably with the assistance of glycerine or other polyhydric alcohol and a condensing agent such as chloride of zinc or chloride of calcium or the like dehydrating agent.

The product is heated to approximately 130° C. then when carbon dioxide has ceased to evolve the temperature is increased to about 150° C. to 170° C. and maintained for a couple of hours.

The resultant mass is almost solid. It is then heated with water and ammonia whereupon diaminoacridine is precipitated and recovered by filtration. The product can then be purified by means of its sulphate which is slightly soluble in dilute $SO_4H_2$. Pure diaminoacridine is then obtained.

The term "organic acid containing at least one carboxyl group and no alkyl group" and not more than two carbonatoms is employed to describe formic or oxalic acid.

I declare that what I claim is:—

1. A process for the manufacture of 3.6.-diaminoacridine which comprises heating m. phenylenediamine with a condensing agent in presence of oxalic acid and glycerine.

2. A process for the manufacture of 3.6-diaminoacridine which consists in heating m. phenylenediamine with a condensing agent in presence of an organic acid containing at least one carboxyl group and no alkyl group, and not more than two carbonatoms in such manner as to eliminate ammonia and carbon dioxide giving 3.6-diaminoacridine.

In witness whereof, I have hereunto signed my name this 6 day of May 1919, in the presence of two subscribing witnesses.

ROBERT MEYER.

Witnesses:
ANTORIM MONTEILHET,
CHAS. P. PRESSLY.